United States Patent [19]
Fukuda

[11] 4,106,039
[45] Aug. 8, 1978

[54] SIDE-FOLDING BELLOWS ELEMENT FOR FOLDING CAMERA

[75] Inventor: Susumu Fukuda, Kobe, Japan

[73] Assignee: Fuji Photo Film Co., Ltd., Minami-ashigara, Japan

[21] Appl. No.: 740,460

[22] Filed: Nov. 10, 1976

[30] Foreign Application Priority Data

Nov. 10, 1975 [JP] Japan .................. 50/135528

[51] Int. Cl.² ........................... G03B 17/04
[52] U.S. Cl. ................... 354/193; 138/121; 354/158; 354/288
[58] Field of Search .......... 354/194, 193, 158, 187, 354/189, 219, 288; 138/121

[56] References Cited
U.S. PATENT DOCUMENTS 3,665,831  5/1972  Harvey .................. 354/187
3,706,267  12/1972  Harvey .................. 354/187
3,906,521  9/1975  Ueda .................. 354/187 X Primary Examiner—Richard A. Wintercorn
Attorney, Agent, or Firm—Sughrue, Rothwell, Mion, Zinn and Macpeak

[57] ABSTRACT

Side-folding bellows element which extends between a lens assembly in a movable lens mount and an exposure compartment in a folding camera, and which when folded has few overlapping parts, may be disposed generally at right-angles to the lens mount when the camera is folded, and may be completely accommodated in a clearance space which is necessarily made available in the camera in order to accommodate the lens mount, whereby provision of extra accommodation for the bellows element in the camera is unnecessary and a more compact folded camera construction is achieved.

3 Claims, 7 Drawing Figures

SIDE-FOLDING BELLOWS ELEMENT FOR FOLDING CAMERA

The present invention relates to a side-folding bellows element for a folding camera. More particularly the invention relates to a bellows element in which there is a minimum overlap of portions of the bellows element when the bellows element is in the folded condition, whereby the bellows element permits a more compact folding camera construction and is especially suited to use in a camera of the auto-process type.

In a camera of the so-called auto-process type film material employed is in the form of independent film units rather than in the form of a continuous roll of film, a plurality of film units generally being initially contained in a pack which is loaded in an exposure compartment defined inside the camera and the camera and/or the film unit pack comprising means for pressing the formost film unit in the pack against a front frame portion of the pack and in line with exposure openings which are defined in the film unit pack and exposure compartment and constitute an exposure station whereat the foremost film unit may be exposed to imagewise light reflected from a scene to be photographed, and each successive film unit, immediately to being exposed, is moved independently to the exterior of the camera, during which movement developing and processing solution is spread through the film unit by the action of processing and forwardly rolls through which the film unit is passed, whereby there is produced a positive image in the film unit by the so-called diffusion-transfer process and there is obtained a positive print in a very short time. During forwarding of the exposed film unit to the exterior of the camera, a succeeding film unit in the film unit pack is brought to the exposure station, in readiness for production of a subsequent photograph. Generally, an auto-process camera must be larger than a camera employing roll film, since it must be at least large enough to contain sheets of photosensitive material equal in size to finished prints.

Because of the increased size of auto-process cameras, transport thereof can be inconvenient, and there have therefore been proposed various types of auto-process cameras with a folding construction according to which when a photograph is to be taken a lens mount carrying a taking lens, shutter, and other film exposure elements is held forward of the front wall of the camera and at a suitable distance from the exposure station in the camera by movable support elements, and when the camera is not required for taking photographs is moved rearwards by the support elements to an interior portion of the camera, whereby the camera has a flatter outline. In addition to the lens mount support elements a folding camera must also include an opaque cover element which is provided between the lens mount and the exposure station, is extendable to define a hollow chamber through which light may pass from the lens assembly to a film unit at the exposure station but which prevents impingement of other external light on the film unit, and which may be folded when the other elements of the camera are folded. One proposed type of opaque cover element is a bellows type which is forwardly and rearwardly movable in a direction parallel to the optical axis of the taking lens assembly of the camera to an extended position or to a folded position. However, when such a bellows element is moved to the folded position there is overlap of a considerable number of portions thereof, with the result that the bellows element is excessively bulky when employed in a large auto-process camera.

Alternatively there has been proposed a bellows element having a source U cross-section such as disclosed in U.S. Pat. No. 3,677,160 which extends between the camera main body portion and a lens support door. However, this bellows element also fails to offer satisfactory compactness since a great many portions thereof overlap when the bellows element is folded, and moreover the bellows element is limited in application since it is employable in association only with cameras having a particular type of construction.

It is accordingly an object of the invention to provide a bellows element which may be folded almost flat, whereby a camera in a folded condition for transport is rendered more compact.

It is another object of the invention to provide a bellows element which permits a compact folding camera construction and is associable with a wide variety of types of camera.

In accomplishing these and other objects there is provided according to the present invention a side-folding bellows elements which includes an upper wall, a lower wall and comparatively narrow, opposed side walls having upper and lower edges in integral connection to the upper and lower walls, has a generally rectangular cross-section when extended, and has a rear end fixedly connected to an exposure compartment and a front end connected to a lens mount which is movable to a forwardly extended position, in which it is in front-to-rear line with an exposure station in the camera and holds a lens assembly in a correct position for taking photographs, or to a retracted position, in which it is out of front-to-rear line with the exposure station and is accommodated in an interior portion of the camera. In a forward end portion of the upper wall and of the lower wall there is defined a fold-in line portion which is parallel to the front edge portion of the wall, and extends to opposite edges of the wall. If the lens mount is swung rearwardly and upwardly when moved from the photograph-taking position to the retracted position, there is further defined in a more central portion of the upper wall another fold-in line portion which also extends to opposite edges of the wall and is parallel to the forward end fold-in line portion defined in the wall. In this case, there is defined in each side wall a fold-out portion which extends from the lower rear corner portion thereof to the junction of the upper edge thereof with the forward end fold-in line portion defined in the upper wall. In the halves into which each side wall is divided by the fold-out line portion defined therein there are provided suitable fold line or pleat portions. In particular, there is provided in each side wall a fold-in portion which extends from the lower rear corner of the wall and joins to a fold-out line portion which extends to the junction of the upper edge thereof with the generally central fold-in line portion extending across the upper wall. If the lens mount is swung rearwardly and downwardly when moved from the photograph-taking position to the retracted position, a generally central fold-in line portion is defined in the lower wall, and the fold-in and fold-out line portions extend from the upper rear corner portion of each side wall to the junctions of the lower edge thereof with the fold-in line portions of the lower wall. With this construction, when the camera is brought to a folded condition, there is overlap only of the upper and lower wall and of small portions of the side walls of the bellows element, and the thickness of the bellows element in the folded condition is much less than that of the lens mount, which must be necessarily accommodated in the camera interior. Thus, the bellows element in the folded condition may be easily accommodated in space inside the camera which is in line with accommodation space which must necessarily be provided to accommodate the lens mount in the retracted position. In other words, there is in effect no requirement for extra accommodation space for folding the bellows element in the camera, which may therefore be rendered compact and easily transportable.

A better understanding of the present invention may be had from the following full description thereof when read in reference to the attached drawings, in which like numbers refer to like parts, and FIG. 1 is a perspective view, partly in section, of a camera employing a side-folding bellows element according to the invention in a folded condition;

Before proceeding with the present description it is to be noted that reference to upper or lower portions of front or rear portions of elements of a camera or of the bellows element according to the invention indicates portions which are upper or lower or are located forwardly or rearwardly with respect to the main body portion of the camera when the camera is in an opened condition for taking photographs and facing the object being photographed.

Figures 1, 2:
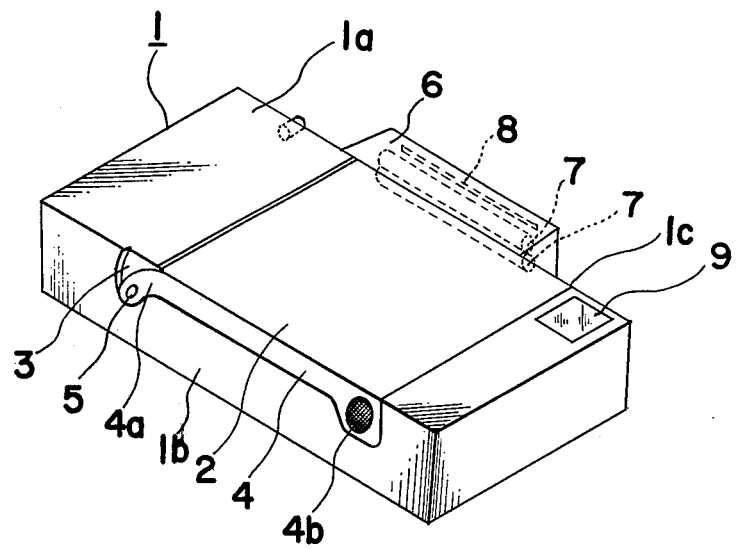
FIG. 2 is a perspective view of the camera of FIG. 1 in an opened condition.

Referring to FIGS. 1 and 2, there is shown a folding camera of the auto-process type in which a side-folding bellows element according to the invention may be suitably employed and which comprises a main body portion 1 having a front wall 1a and left and right side walls 1b and 1c. An open portion in the front wall 1a and cut-out portions 1b' and 1c' in the side walls 1b and 1c define the forward portion of a front opening 1a'. When the camera is in the folded condition shown in FIG. 1 the outer surface of a front cover 2 is flat with respect to the front wall 1a of the camera main body portion 1 and front cover side walls 4 which are in integral attachment to the front cover 2 and extend rearwardly from left and right edge portions thereof lie in the side wall cut-out portions 1b' and 1c' and are flat with respect to corresponding side walls 1b and 1c, i.e., the front cover 2 and side walls 4 thereof in effect constitute front and side wall portions of the camera. The lower end portions of the front cover 2 and side walls 4 thereof are curved upwardly and in the lower end portion of each opposite side wall 4 there are provided bearing elements 4a through which the front cover 2 is pivotally mounted on pins 5 which are fixedly attached to the side walls 1b and 1c of the camera. Thus, the front cover 2 is pivotal to or from the closed position shown in FIG. 1 from or to the opened position shown in FIG. 2 in which the front cover 2 is inclined forwardly and upwardly with respect to the camera front wall 1a. During this movement of the front cover 2, the curved lower end portions of the front cover side walls 4 slide in correspondingly curved portions 3 which are defined by the lower end portions of the cut-out portions 1b' and 1c' defined in the camera side walls 1b and 1c. On the outer surface of the upper end portion of each side wall 4 of the front cover 2 there is defined a rough cross-cut portion 4b to facilitate holding of the front cover 2 by a photographer in order to move the front cover 2 to or from the opened position.

Figure 3:
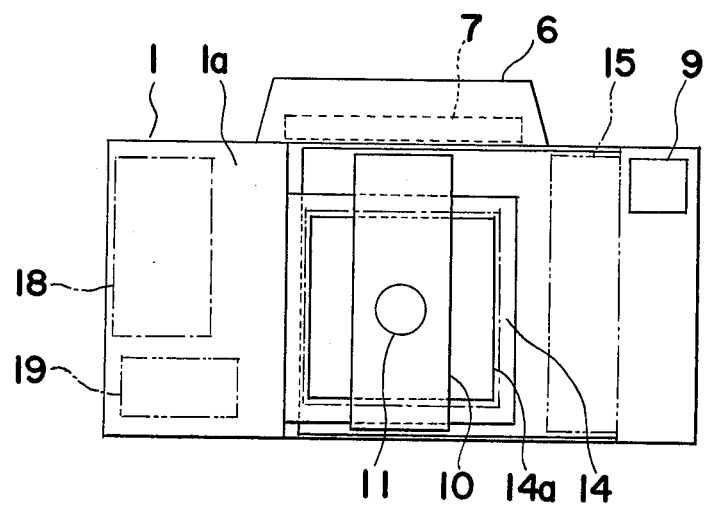
FIG. 3 is a front view, partly in section, of the camera of FIG. 1.
Figure 4:
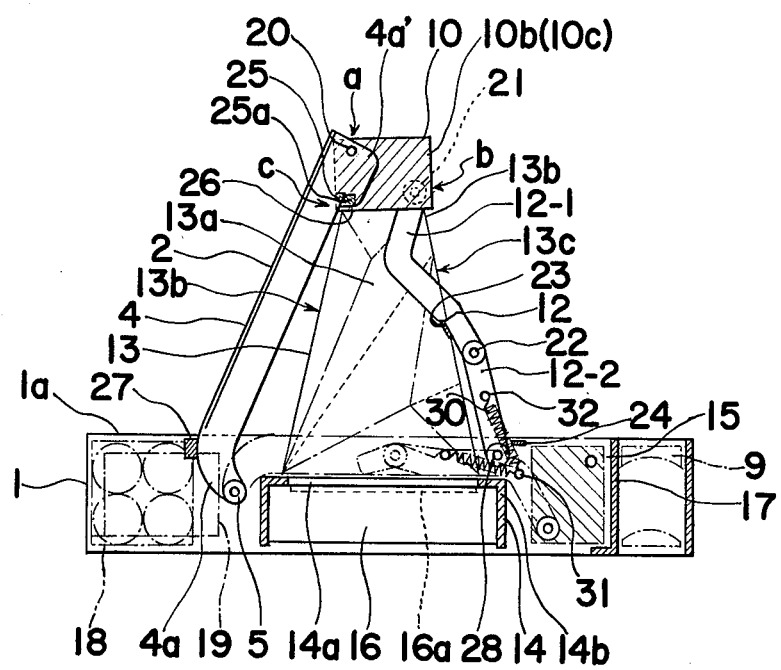
FIG. 4 is a cross-sectional view of the camera of FIG. 1 in an opened condition.

Referring to FIGS. 3 and 4, in a generally central portion of the camera main body portion 1 there is defined a 1st housing 14 which may accommodate successive film unit packs 16 containing film units for production of photographs by the diffusion-transfer process, each film unit pack defining a front opening 16a which corresponds to, and, when the film unit pack 16 is loaded in the camera fits in line with a front wall opening 14a which is defined in the 1st housing 14 and through which a foremost film unit in the film unit pack 16 may be exposed to image-wise light which is reflected from an external scene to be photographed and is directed onto the foremost film unit by a lens assembly 11 which is supported in a movable lens mount 10 described in greater detail below.

In FIGS. 1, 2, and 3, subsequent to exposure thereof a foremost film unit in a pack 16 loaded in the camera is automatically moved sideways from the pack 16 by known means not shown and brought into engagement with a pair of vertically aligned processing and forwarding rolls 7 which are provided in a roll housing 6 attached to and projecting from the side wall 1c of the camera, and which while causing processing solution to be spread through the exposed film unit to effect development of a positive image therein simultaneously forward the film unit to the exterior of the camera via an exit slit 8 defined in an outer wall portion of the roll housing 6.

In FIGS. 1 through 4, in the upper portion of the camera there is a viewfinder housing 9a which accommodates a viewfinder 9. Between the upper wall of the 1st housing 14, lower wall of the viewfinder housing 9a and upper end portions of the camera side walls 1b and 1c, i.e., in the upper portion of the front opening 1a', there is defined a 2nd housing 15, which serves to accommodate the abovementioned lens mount 10 when the camera is in the folded condition.

In FIGS. 3 and 4, the lower end portion of the camera main body portion 1 accommodates batteries 18 and a motor 19 for actuation of the processing and forwarding rolls 7 and other elements not shown for effecting required movement of film units through the camera.

In FIG. 2, the lens mount 10 is pivotally supported by the front end portions of opposite side walls 4 of the front cover 2 and by two lever assemblies 12, which are provided on opposite sides of the lens mount 10. A side-folding bellows element 13 described in greater detail below has a forward end portion fixedly attached to the rear surface of the lens mount 10 and a rear end portion fixedly attached to the front wall portion of the 1st housing 14.

More particular reference is now had to FIG. 4, which shows details of the mode of support of the lens mount 10. For brevity in the following description, only one lever assembly 12 and only one side of the lens mount 10 is described, it being understood that both lever assemblies 12 are identical and that the lens mount 10 is supported in the same manner on both sides thereof. The lever assembly 12 comprises an elbow-shaped outer lever 12-1, and a rear lever 12-2, which is straight, which has a point which is near to but not at the outer end thereof in pivotal attachment to the outer lever 12-1 through a pivot pin 22, and whose inner end is pivotally mounted on a pin 28 which is fixedly attached to the side wall of the camera main body portion 1. The outer end of the outer lever 12-1 is in pivotal attachment to the upper rear corner portion of the lens mount 10 through a pin 10a which is fixedly attached to and projects from the lens mount side wall and extends into an opening defined in the outer end of the outer lever 12-1. When the camera is opened, the elbow defined by the outer lever 12-1 is bent downwards. Fixedly attached to a generally central portion of the rear lever 12-2 there is a projecting pin 32 having attached thereto one end of a compression spring 30, whose opposite end is attached to a pin 31, which is fixedly attached to a portion of the camera side wall which is above and rearward of the point of attachment of the inner lever pivot pin 28 to the camera side wall. When the lever assembly 12 is in the opened position, therefore, the spring 30 acts to pivot the rear lever 12-2 about the pivot pin 22 in an anticlockwise direction as seen in FIG. 4. At this time, a stopper 23 which is fixed to a lower edge portion of the outer lever 12-1 and is contactable by the outer end of the inner lever 12-2 prevents more than a certain amount of anticlockwise movement of the inner lever 12-2 about the pin 22, and a stopper 24 which is fixed to an upper portion of the camera side wall and is contactable by the upper edge of a rear end portion of the inner lever 12-2 prevents more than a certain amount of clockwise movement of the inner lever 12-2 with respect to the main body portion 1 of the camera.

The lower front corner portion of the lens mount 10 is pivotally connected to the outer end of the side wall 4 of the front cover 2 through a pin 10a which is fixedly connected to the lens mount side wall and extends into an opening formed in the outer end of the side wall 4. A stopper 27 provided in the lower end of the cut-out portion, 1b' or 1c', of the camera side wall and contactable by the lower end of the lens side wall 4 prevents the front cover 2 from pivoting anticlockwise more than a certain amount about the pin 5. Fixedly attached to a lower rear corner portion of the lens mount side wall there is a stopper 25, the right-hand side 25a of which is contactable by a stopper 26 which is fixedly attached to the inner side of the outer end of the front cover side wall 4, whereby the lever assembly 12 is prevented from causing the lens mount 10 to pivot clockwise more than a certain amount with respect to the front cover 2, and the lens mount 10 is securely held in a required position and in a required disposition by the front cover 2 and lever assembly 12.

To close the camera, downward pressure is applied on a portion of the upper edge of the inner lever 12-1 which is adjacent to the pivot connection pin 22, in order to overcome the force of the spring 30 and cause the lever 12-2 to pivot anticlockwise about the pivot pin 22. Upon application of this pressure, the outer lever 12-1 is pivoted anticlockwise about the pivot connection pin 22 and folded towards the inner lever 12-2, the lens mount 10 is swung rearwards and upwards, and the front cover 2 is pivoted clockwise about the pins 5, the lens mount 10 being eventually brought into the 2nd housing 15 and the front cover 2 being brought into a disposition in which it is flat with respect to the camera front wall 1a, as shown in FIG. 4 and FIG. 1. During this movement, since the pin 31 to which one end of the spring 30 is attached is rearward of the pivot pin 28 on which the inner lever 12-2 is mounted, after the inner lever 12-2 has been pivoted more than a certain amount anticlockwise about the pin 28, the spring 30 acts to pull the camera elements into the folded condition, the spring 30 also acting to hold the camera elements in the folded condition when the camera is completely closed. As shown in FIG. 4, since the front-to-rear dimension of the lens mount 10 is greater than the front-to-rear dimension of the 1st housing 14, which need only be large enough to contain a film unit pack 16, and since the front-to-rear dimension of the camera is large enough to permit complete accommodation of the lens mount 10 in the interior of the camera, there is a clearance between the front of the 1st housing 14 and the plane of the camera front wall 1a.

Figure 5:
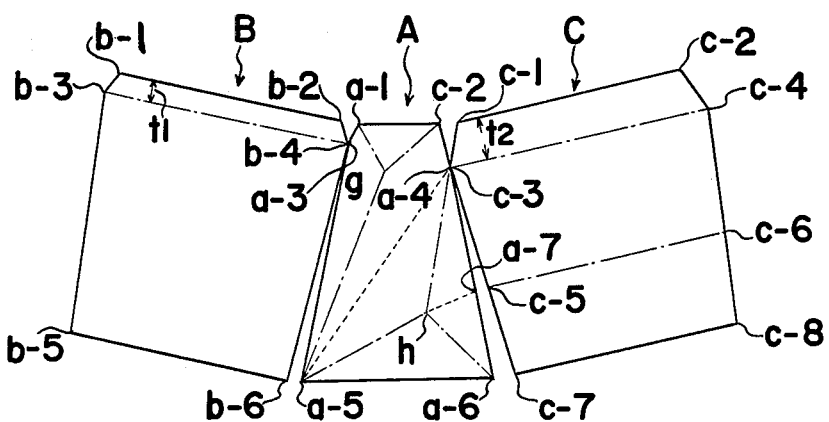
FIG. 5 is a lay-out view showing construction of a side-folding bellows element according to the invention.
Figure 6:
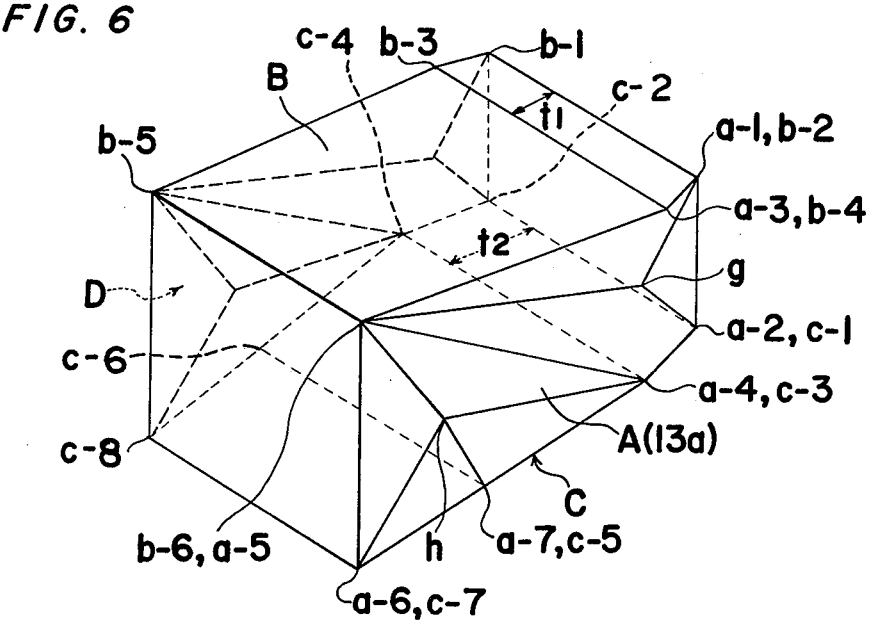
FIG. 6 is a perspective view, partly in section, of the bellows element of the invention in an opened condition.

Referring now to FIGS. 5 and 6, in which dashed lines indicate fold-out line portions of the side-folding bellows element 13 and chain-dot line portions indicate fold-in line portions thereof, the bellows element 13 is made of an opaque material and comprises comparatively narrow side walls 13A, a lower wall 13B, and an upper wall 13C, and defines a front opening which is at least equal to the area occupied by the lens assembly 11 and a rear opening which is at least equal to the area occupied by the exposure opening 14a defined by the front wall portion of the first housing 14. Each side wall 13A is defined by a front edge a-1,2 which is fixedly attached to a side portion of the rear wall of the lens mount 10, point a-2 being the upper end of the front edge a-1,2, a short lower forward edge portion a-1,3 which leads rearwardly from the front edge a-1,2 and is inclined thereto at an angle somewhat greater than 90°, an upper forward edge portion a-2,4 which leads rearwardly from the front edge a-1,2, is inclined thereto at an angle which is greater than 90° but less than the angle between the front edge a-1,2 and lower forward edge portion a-1,3, and is also short but somewhat longer than the lower forward edge portion a-1,3. In continuation to the short, lower forward edge portion a-1,3, and inclined thereto at a large obtuse angle, there is a long, lower rear edge portion a-3,5 which connects at an acute angle close to 90° to the lower corner a-5 of the side wall rear edge a-5,6, which is approximately twice as long as the front edge a-1,2, and is fixedly connected to a side portion of the front wall of the 1st housing 14. A long, upper rear edge portion a-4,6 joins the upper forward edge portion a-2,4. to the upper corner a-6 of the rear edge a-5,6, and is in more or less straight line continuation to the upper forward edge portion a-2,4 of the side wall 13A.

The lower wall 13B is defined by a front edge b-1,2 which is fixedly attached to a lower portion of the rear wall of the lens mount 10, short left and right forward-end edge portions b-1, 3 and b-2, 4 each of which is inclined at an angle somewhat greater than 90° to the front edge b-1,2 and is integrally attached to a lower forward edge portion a-1,3 of a side wall 13A, a rear edge b-5,6 which is approximately equal in length to the front edge b-1,2 and is fixedly attached to a lower portion of the front wall of the 1st housing 14, and long, rear-end left and right edge portions b-3,5 and b-4,6 which respectively join the rear corner b-5 and rear corner b-6 to the corners b-3 and b-4 of the forward end edge portions b-1,3 and b-2,4, and are integrally attached to the lower rearedge portions a-3,5 of opposite side walls 13A.

The upper wall 13C has a hexagonal shape generally similar to that of the lower wall 13B and is defined by a front edge c-1,2, which is fixedly attached to an upper portion of the rear wall of the lens mount 10, short forward-end edge portions c-1,3 and c-2,4, which are equal in length to and are integrally attached to the upper forward-edge portions a-2,4 of opposite side walls 13A, long rear-end edge portions c-3,7 and c-4,8, which are equal in length to and are integrally attached to the rear upper edge portions a-4,6 of opposite side walls 13A, and rear edge c-7,8, which is fixedly attached to an upper portion of the front wall of the 1st housing 14.

Between the points b-3 and b-4 on the lower wall 13B there is a fold-in line portion b-3,4 which is parallel to the front edge b-1,2 and separated therefrom by a distance t1.

In the upper wall 13C there is formed a fold-in line portion c-3,4 between the points c-3 and c-4 which is parallel to the front edge c-1,2 and is separated therefrom by a distance, which, since the edge portions c-1,3 and c-2,4 are equal in length to the edge portions a-2,4 of the side walls 13A and are longer than the edge portions b-1,3 and b-2,4 of the lower wall 13B, is greater than the distance by which the line portion b-3,4 is separated from the front edge b-1,2 of the lower wall 13B. The upper wall 13C includes another fold-in line portion c-5,6, which extends between points c-5 and c-6 on the left and right rear end edge portions c-3,7 and c-4,8 of the wall 13C, and is parallel to the fold-in line portion c-3,4, the distance between the fold-in line portion c-3,4 and the fold-in line portion c-5,6 being approximately twice the distance between the fold-in line portion c-5,6 and the rear edge c-7,8 of the wall 13C.

In each side wall 13A, there is defined a fold-out line portion a-5,4 extending from the lower rear corner a-5 of the side wall 13A to the point at which the fold-in line portion c-3,4 in the upper wall 13C meets the upper edge of the side wall 13A. Also in each side wall 13A there are formed fold-in line portions a-2,g, a-1,g, and a-5,g between the points a-2, a-1, and a-5 and a point g which is located at or close to the point of intersection of the bisectors of the angles defined between the lines a-1,2 and a-1,3 and between the lines a-3,5 and a-5,4. Considering the triangle defined by the points a-4, a-5, and a-6, in each side wall 13A, the bisectors of the angles of this triangle meet at or close to a point h. A fold-in line portion is defined between point a-4 and point h, between point a-5 and point h, and between point a-6 and point h, and a fold-out line portion is defined between point h and the point a-7 at which the upper edge portion of the side wall 13A meets the generally central fold-in line portion c-5,6 of the upper wall 13C.

As shown most clearly in FIGS. 1 and 6, with this construction of the bellows element 13, when the lens mount 10 is in the photograph-taking position the bellows element 13 is extended and opens up to form a lightproof passage which has a rectangular cross-section, has a slightly narrowed forward end portion, and permits unhindered projection of image-wise light onto a film unit in a pack 16 by the lens assembly 11.

Figure 7:
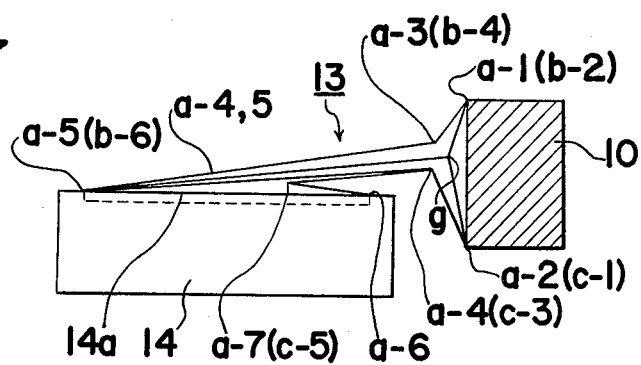
FIG. 7 is a side view illustrating the manner of folding of the bellows element of the invention.

Referring to FIG. 7, when the camera is folded, the forward and upper portions of the side walls 13A fold inwards along the line portions a-2,g, a-1,g, and a-5,g, and the lower and upper walls 13B and 13C fold inwards along the lines b-3,4 and c-3,4, so permitting the rear portion of the bellows element 13 to extend at approximately right-angles to the rear surface of the lens mount 10 when the bellows element rear portion is folded. At the same time, the side walls 13A fold out along the fold-out line portions a-5,4 thereof, the portion of each side wall 13A which lies between the edge portion a-3,5 and the fold-out line portion a-5,4 thereof folds in along the fold-in line portion a-5,g, and the upper wall 13C also folds inwards along the line portion c-5,6, the portion of the upper wall 13C which is adjacent to the line c-5,6 folding into the fold-out line portions a-7,h of the side walls 13A, and the remaining portions of each side wall 13A folding in between the upper wall 13C and the fold-out line portion a-5,4 along the fold-in line portions a-4,h, a-5,h, and a-6,h. When the lens mount 10 has been brought completely into the 2nd housing 15 the bellows element 13 is generally flat and is completely accommodated in the clearance defined between the front wall of the 1st housing 14 and the plane of the front opening 1', and both the bellows element 13 and the lens mount 10 are completely enclosed by the front cover 2.

Thus the invention provides a bellows element which in effect requires no extra accommodation space in a camera and permits the camera to have a very compact and easily transportable form.

Needless to say, although the bellows element of the invention has been described above in reference to use thereof in an auto-process camera, the bellows element is not restricted to use in such a camera, but may be employed in any folding camera in which a lens mount carrying a lens assembly is swung forwardly or rearwardly between a retracted position and a photograph taking position. If a lens mount is moved downwardly from the photograph-taking position, then of course the lower wall 13B has the construction of the upper wall 13C, and vice-versa, the fold-out line portion a-5,4 of each side wall 13A extends diagonally from the upper rear corner of the wall, and the disposition of other fold-in and fold-out line portions of the side walls 13A is changed accordingly.

What is claimed is:

1. In a folding camera comprising a main body of rectangular box-like configuration having a first housing section which is formed with an exposure opening in a forward wall thereof facing a forward side of the main body in terms of the object being photographed so as to accommodate therein a film container in such a manner that an exposure opening of the film container coincides with said exposure opening of said first housing section and a second housing section being formed in a position adjacent to said first housing section and between said forward side and a rear side of said main body, lens supporting means having exposure means incorporated therein, a cover plate member pivotably connected at one end thereof to said main body in a position corresponding to said second housing section with said exposure opening of said first housing section being located therebetween, for rotation between a first position to cover said forward side of said main body and a second position whereat said lens supporting means is held in photographing position, with the other end of said cover plate member pivotably connected to an adjacent corner portion of the sidewall of said lens supporting means for covering, at said first position, said forward side of said main body into which said lens supporting means is housed, a pair of folding link levers, each pair having first and second lever members pivotably connected at their ends to each other for being folded in one direction with one end of the first lever member of each of the pairs being pivotably connected to said main body and one end of the second lever member of each of said pairs being pivotably connected to the corner portion diametrically opposite to said adjacent corner portion of the sidewall of said lens supporting means for pivotably supporting said lens supporting means together with said cover plate member, during rotation thereof between said first and second positions, and a collapsible light-shielding bellows having one peripheral edge secured around said exposure opening of said first housing section, and the other peripheral edge thereof fixed around the rear face of said lens supporting means with said bellows being expanded at said second position and folded into a flat state at said first position, the improvement wherein said main body first housing section forms an exposure compartment, said lens supporting means comprises a lens mount and said main body second housing section constitutes a lens mount housing, said bellows comprises a side folding bellows element made of opaque material and comprising a first wall which is nearest to said lens mount housing, and a second wall which is parallel to said first wall, and identical third and fourth walls which extend between and are integrally attached to opposite side edge portions of said first and second walls, the front edges of said first, second, third, and fourth walls being fixedly attached to the rear surface of said lens mount and together therewith defining an opening through which image-wise light directed towards the interior of said camera by said lens assembly may freely pass, the rear edges of said first, second, third, and fourths walls being fixedly attached to the front surface of said first housing section at said exposure compartment together therewith defining an opening which permits free impingement of said image-wise light on said film material, said first wall having defined therein a forward-end fold-in line portion which is a short distance from and is parallel to the front edge of said wall and extends between opposite side edges of said wall and a generally central rear end fold-in line portion which extends between opposite side edges of said first wall and is parallel to said first forward-end fold-in line portion of said first wall, said second wall defining a forward-end fold-in line portion which is a short distance from and is parallel to the front edge of said second wall and extends between opposite side edges of said second wall, and each of said third and fourth walls defining a first fold-out line portion which extends from a first corner portion thereof which adjoins a rear corner portion of said second wall to a point at which said forward-end fold-in line portion of said first wall meets an edge of said third and fourth walls, and subsidiary fold-in and fold-out line portions in the areas defined between said first fold-out line portion and edge portions of said third and fourth walls.

2. The folding camera as claimed in claim 1, wherein said subsidiary fold-in and fold-out line portions in each of said third and fourth walls include at least three fold-in line portions which are defined in an area of said wall which is defined between a side edge portion and the front edge of said third and fourth walls and which extend radially from a generally central point which is at or near the center of a circle inscribable in said area, and three fold-in line portions and a second fold-out line portion which are defined in an area which is defined between a side edge portion and the rear edge of said third and fourth walls and which extend radially from a generally central point which is at or near the center of a circle inscribable in said area, said second fold-out line portion extending from said generally central point to a point at which said rear-end fold-in line portion of said first wall meets an edge of said third or fourth wall.

3. In a folding camera comprising a main body of rectangular box-like configuration having a first housing section defining an exposure compartment which is formed with an exposure opening in a forward wall thereof facing a forward side of said main body in terms of an object being photographed so as to accommodate therein a film container in such a manner that an exposure opening in the film container coincides with said exposure opening in said first housing section such that film material may be exposed to image-wise light and a second housing section being formed in a position adjacent to said first housing section and being a lens mount housing and lying between said forward side and a rear side of the main body, lens supporting means comprising a lens mount having exposure means incorporated therein and being movable from a forwardly projecting position for taking photographs to a retracted position wherein said lens mount is accommodated in said second housing section interior of said camera, a cover plate member pivotably connected at one end thereof to said main body in a position corresponding to said second housing section with said exposure opening of said first housing section being located therebetween, for rotation between a first position to cover said forward side of said main body and a second position whereat said lens mount is held in said photographing position, with the other end of said cover plate member pivotably connected to an adjacent corner portion of the sidewall of said lens mount for covering, at said first position, said forward side of said main body into which said lens mount is housed, a pair of folding link levers, each pair having first and second lever members pivotably connected at their ends to each other for being folded in one direction with one end of the first lever member of each of said pairs being pivotably connected to said main body and one end of the second lever member of each of said pairs being pivotably connected to the corner portion diametrically opposite of said lens mount to said adjacent corner portion for pivotably supporting said lens mount together with said cover plate member, during rotation thereof, between said first and second positions, and a collapsible light-shielding bellows having one peripheral edge secured around said exposure aperture of said first housing section, and the other peripheral edge thereof fixed around the rear face of said lens mount with said bellows being expanded at said second position and being folded into a flat state at said first position, the improvement wherein said bellows comprises a side-folding bellows element made of opaque material which includes an upper wall, a lower wall and comparatively narrow, opposed side walls having upper and lower edges in integral connection with the upper and lower walls, and having a generally rectangular cross-section when extended, each of said upper wall and said lower wall being defined in its forward end portion in a fold-in line portion which is parallel to the front edge portion of the upper or lower wall, respectively, and extending to opposite edges of the upper or lower wall, respectively, the upper wall being further defined in its central portion with another fold-in line portion which also extends to opposite edges of the upper wall and is parallel to the forward end fold-in line portion defined in the upper wall, each of the side walls being defined by a fold-out line portion which extends from the lower rear corner portion thereof to the junction of the upper edge thereof with the forward end fold-in line portion defined in the upper wall and a fold-in portion which extends from the lower rear corner of the side wall and joins to a fold-out line portion which extends to the junction of the upper edge thereof with the generally central fold-in line portion extending across the upper wall, the lower wall being further defined in its central portion by another fold-in line portion which extends from the upper rear corner portion of each side wall to the junctions of the lower edge thereof, and, when the lens mount is brought to its retracted position, there being an overlap only of the upper and lower walls and of small portions of the side walls of the bellows element, whereby the thickness of the bellows element in the folded condition is substantially less than that of the lens mount which is accommodated in said second housing section, generally at right angles to the major portion of said side-folding bellows element.

* * * * *